Figure 1:
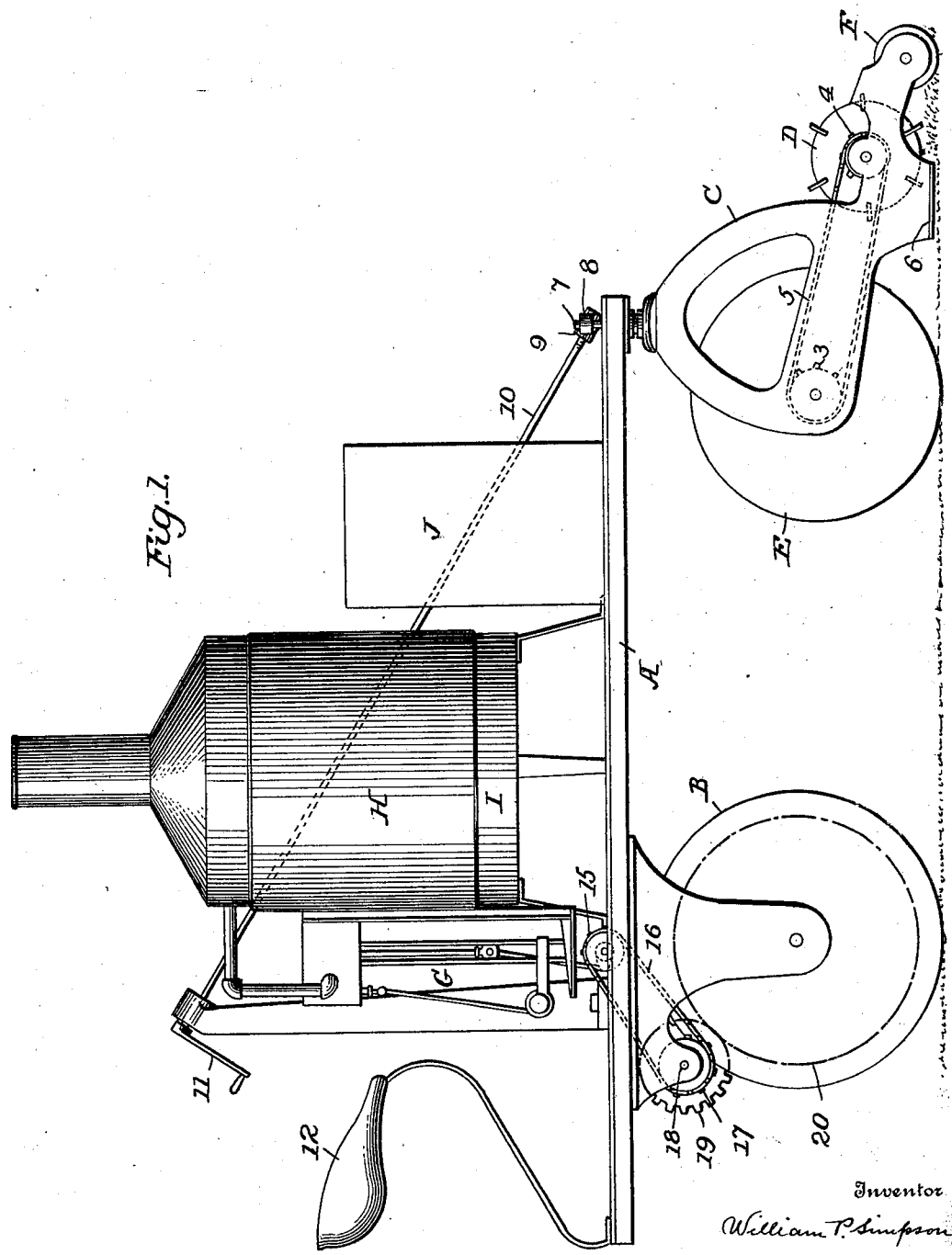

No. 670,458. Patented Mar. 26, 1901.
W. P. SIMPSON.
COMBINATION POWER LAWN MOWER AND ROLLER.
(Application filed June 1, 1900.)
(No Model.) 2 Sheets—Sheet 1.

Witnesses
J. G. Hinkel
[signature]

Inventor
William P. Simpson,
by Foster and Freeman,
Attorneys

THE NORRIS PETERS CO., PHOTO-LITHO., WASHINGTON, D. C.

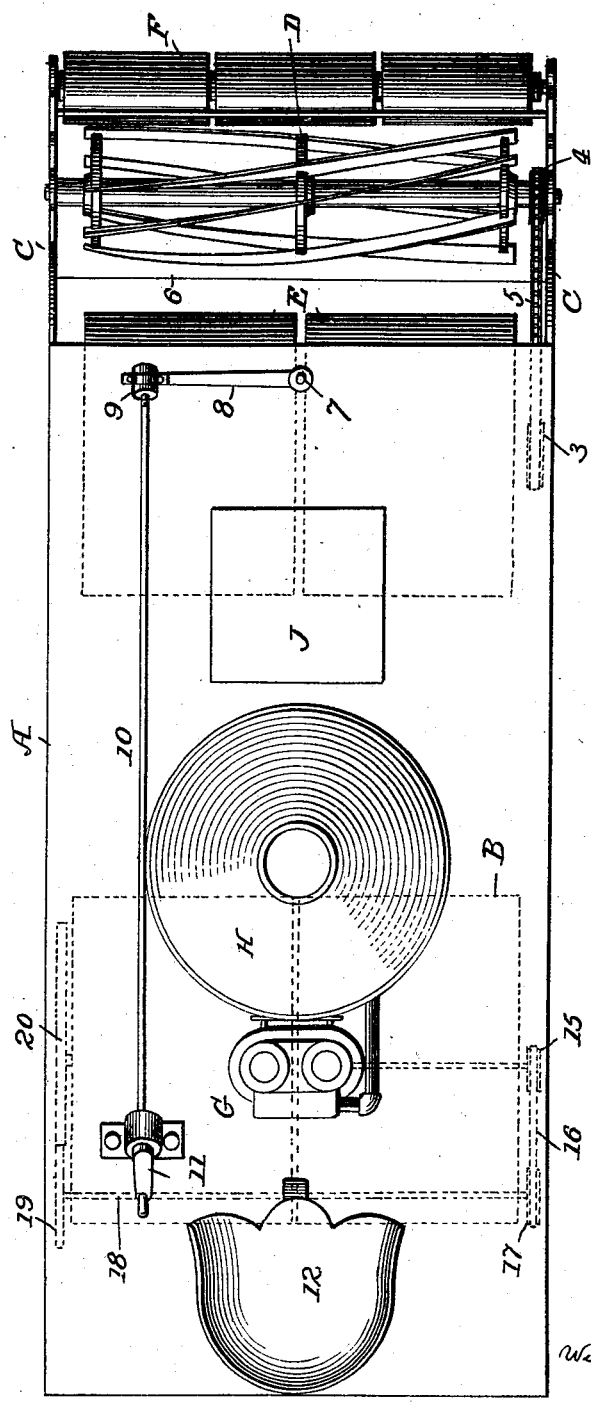

UNITED STATES PATENT OFFICE.

WILLIAM PERCY SIMPSON, OF OVERBROOK, PENNSYLVANIA.

COMBINATION POWER LAWN MOWER AND ROLLER.

SPECIFICATION forming part of Letters Patent No. 670,458, dated March 26, 1901.

Application filed June 1, 1900. Serial No. 18,754. (No model.)

*To all whom it may concern:*

Be it known that I, WILLIAM PERCY SIMPSON, a citizen of the United States, residing at Overbrook, in the county of Montgomery and State of Pennsylvania, have invented certain new and useful Improvements in Combination Power Lawn Mowers and Rollers, of which the following is a specification.

My invention relates to apparatus for mowing and rolling lawns; and it consists in a combined cutter and roller constructed so as to secure a rapid cutting and rolling operation, as fully set forth hereinafter and as illustrated in the accompanying drawings, in which—

Figure 1 is a side elevation of my improved combination of mower and roller, and Fig. 2 a plan view.

The frame of the apparatus is of any suitable construction to support the operating parts and for connection with the mowing and rolling devices.

As shown, the frame A is supported at the rear by a roller B and at the front by the frame C of the combined roller and mower. The cutting or mowing device may be a rotating head D, with knives cutting against a blade 6, as shown, or may consist of reciprocating knives, as sometimes employed, and the roller E is at the rear of the cutter and supports the frame C at the rear, while the front portion of the frame C is supported by a series of rollers F. Suitable means, as sprockets 3 and 4 and a chain 5, are employed for imparting motion to the cutting devices from the shaft of the roller E. The frame C is pivoted to the frame A and is adapted to swing under it, and the pintle or shaft 7 of the frame C extends upward through the frame A and is provided with an arm 8, carrying a swinging nut 9, into which extends a long screw-shaft 10, having a handle 11 adjacent to a seat 12 at the rear of the machine, so that the operator on said seat by turning said handle may turn the frame C, thus properly directing the course of the machine, so as to cut upon any path required.

The frame A may be driven by horse-power or otherwise, as desired; but, as shown, it carries a motor G and a boiler H above the burner I, supplied with fuel from a tank J in a manner which will be too well understood to require explanation, and the shaft of the motor is provided with a sprocket 15, from which a chain 16 passes to a sprocket 17 on a shaft 18, carrying a pinion 19, which gears with a toothed wheel 20 at one end of the roller B.

The rollers B and E may be made in sections or each may be a single roller.

It will be seen that in the construction above described I combine the cutter and roller in such manner that the rolling is effected in the line of the cut and that the two are directed simultaneously, being mounted in the same frame, so as to properly coöperate. At the same time in addition I secure the advantage of a heavier roller B, supporting the weight of the machine and operator, so that the grass may be rapidly cut and maintained in a most effective condition, while by the use of a motor upon the frame I am enabled to operate more rapidly and with less injury to the sod than results when the apparatus is propelled by an animal.

Without limiting myself to the precise details of construction and arrangement of parts shown, I claim as my invention—

In a lawn mower and roller, the combination of a frame A, a motor supported on the frame, a roller journaled in the frame near the rear end thereof, gearing to transmit motion to said roller from the motor, a frame C having a vertical pintle journaled in the front end of the frame A, a roller E journaled in the frame C, a rotary cutter journaled in the frame C in advance of the roller E, means to transmit movement from the roller E to the cutter, and devices connected to the frame C and extending above the frame A for swinging the frame C and its roller and cutter, substantially as set forth.

In testimony whereof I have signed my name to this specification in the presence of two subscribing witnesses.

WM. PERCY SIMPSON.

Witnesses:
J. C. TAYLOR,
EDITH WAUGH.